United States Patent
Ilcisin et al.

(10) Patent No.: US 6,888,583 B2
(45) Date of Patent: May 3, 2005

(54) METHOD AND APPARATUS FOR ADJUSTED DC OFFSET POTENTIAL IN A LIQUID CRYSTAL DISPLAY (LCD) DEVICE

(75) Inventors: Kevin J. Ilcisin, Beaverton, OR (US); Douglas J. McKnight, Boulder, CO (US)

(73) Assignee: Brillian Corporation, Tempe, AZ (US)

( * ) Notice: Subject to any disclaimer, the term of this patent is extended or adjusted under 35 U.S.C. 154(b) by 613 days.

(21) Appl. No.: 09/863,211

(22) Filed: May 21, 2001

(65) Prior Publication Data

US 2003/0001997 A1 Jan. 2, 2003

(51) Int. Cl.$^7$ ............................................. G02F 1/1333
(52) U.S. Cl. ............................ 349/33; 349/34; 349/31; 349/35; 349/32; 349/122; 349/121; 349/123; 345/87; 345/88; 345/86
(58) Field of Search ................................ 349/122, 123, 349/155, 156, 138, 158, 133, 132

(56) References Cited

U.S. PATENT DOCUMENTS

| | | | |
|---|---|---|---|
| 5,764,324 A | 6/1998 | Lu et al. | |
| 5,796,458 A | * 8/1998 | Koike et al. | 349/126 |
| 5,831,705 A | 11/1998 | Kaneko et al. | |
| 5,892,563 A | 4/1999 | Ono et al. | |
| 6,122,031 A | * 9/2000 | Terada et al. | 349/155 |
| 6,313,901 B1 | 11/2001 | Cacharelis | |

FOREIGN PATENT DOCUMENTS

WO  WO 00 05621 A  2/2000

OTHER PUBLICATIONS

Inoue H: "Flicker and image sticking in hybrid alignment nematic panels" Proceedings of the 18$^{th}$, International display research conference. Asia display '98, proceedings of eighteenth international display research conference (Asia display '98), Seoul, South Korea, Sep. 28–Oct. 1, 1998, pp. 975–978, Xp002236748 USA Whole document.

Huang HC et al: "Characterization and minimization of flicker in silicon light valves". Journal of Applied Physics, American Institute of Physics, New York, US, vol. 89, No. 2, Jan. 15, 2001, pp. 831–837, XP001011754, ISSN: 0021–8979 Chapter: VI. Solutions of Flicker Minimization.

* cited by examiner

*Primary Examiner*—Nathan J. Flynn
*Assistant Examiner*—Fazli Erdem
(74) *Attorney, Agent, or Firm*—Baker Botts L.L.P.

(57) ABSTRACT

Methods and apparatus for adjusting or reducing intrinsic DC offset potential in a Liquid Crystal Display (LCD) are taught. The methods allow the upper and lower assemblies of the LCD device to be manufactured with selected materials while achieving adjusted or reduced intrinsic DC offset potential in the finished LCD device. The methods are especially useful for reflective LCD designs where it is not possible to build the LCD with symmetric assemblies.

16 Claims, 12 Drawing Sheets

METHOD AND APPARATUS FOR ADJUSTED DC OFFSET POTENTIAL IN A LIQUID CRYSTAL DISPLAY (LCD) DEVICE

CROSS REFERENCES TO RELATED APPLICATIONS

Co-pending, commonly assigned U.S. patent application entitled "Method and Apparatus For Predicting DC Offset Potential In a Liquid Crystal Display (LCD) Device," filed on the same day as this application, U.S. Ser. No. 09/863,212 by Kevin J. Ilcisin and Douglas J. Mc Knight.

FIELD OF THE INVENTION

The present invention relates to the field of Liquid Crystal Displays (LCDs) and specifically to LCDs with reduced DC offset potential.

BACKGROUND OF THE INVENTION

LCDs describe a broad class of display devices that are used in a variety of applications. Some of the applications are directed to information displays and range from low to high information content. Some examples of low information content displays are watches, calculators, gas pump counters, and portable video games. Some examples of high information content displays are laptop computers, flat panel television screens, video projectors, and head mounted virtual displays.

Although each specific LCD product or application will impose specific constrains on the design, fabrication, and operation of the device, there are fundamental structural components, which are shared by almost all LCD devices. FIG. 1 shows a cross-sectional view of the basic components of a LCD device. LCD device 10 is comprised of liquid crystal (LC) material 7, which is contained, from below, by lower alignment layer 3, which is in contact with lower electrode 2, which is in further contact with lower substrate 1. From above, upper substrate 4 is in contact with upper electrode 5, which contacts upper alignment layer 6. Upper alignment layer 6 is in contact with LC material 7. In the case of high information content displays, the components of LCD device 10 shown in FIG. 1 represent the basic components of a typical single pixel. A typical display is comprised of a plurality of such pixels arranged in either an array or other geometric fashion. The geometry of some of the components, such as the electrodes, may depend on the display of interest, the exact configuration being selected by the device designer. In the following discussions, descriptions of the structure of a LCD device as in FIG. 1 and subsequent figures will be used to described either a display or a pixel interchangeably. When an assembly or device is described in the following sections, it will be understood by one skilled in the art that the device, assembly, layers, and electrodes can be either individual pixels, an entire area of pixels, or the entire display area.

Liquid crystals are noted for their anisotropic electrical and optical properties. The optical anisotropy causes birefringence due to the molecular structure and orientation of the LC material. It is known, to those of skill in the art, that the birefringence caused by the optical anisotropy of the LC molecules affects the state of polarization of a polarized light wave passing through the LC layer. Additionally, it is known to those of skill in the art, that when an electric field is applied between the electrodes and across the LC layer, the LC molecules align themselves with respect to the field, the specific orientation depending on the magnitude of the dielectric anisotropy.

Applying a voltage across the LC layer, using the upper and lower electrodes, operates a LCD device. The electrical anisotropy of the LCD material causes a deformation of the LCD material from its equilibrium position, in response to the applied voltage, and can induce the desired modulation of the polarized light passing through the LC layer in cooperation with a suitable analyzer. The viewer of the device will see a change in the intensity of the observable light. The degree of modulation and hence the intensity of the light observed by the viewer is typically determined by the amplitude of the voltage placed across the LC layer. For proper operation of a LCD device it is necessary to apply any deforming voltage as a purely AC signal, with no net DC voltage being placed across the LC layer. Neither should there be any intrinsic DC offset existing within the LCD device due to the properties of the device.

Undesirable effects caused by the DC fields are observable to the viewer in the form of flicker, image sticking, and voltage shielding. FIG. 2 shows some of the characteristics of a LCD device with and without an intrinsic DC offset. Characteristics of a prior art LCD device containing a DC offset are shown in 2b. The corresponding characteristics of a LCD device, according to the present invention, are shown in 2a. If a DC voltage is placed across the electrodes of a LCD device or if a LCD cell has an intrinsic, DC offset potential, differences in the observed intensity for the positive and negative polarities of the applied AC waveform will appear. This results in the two curves for observed intensity 15 instead of the single curve for observed intensity 12 which would exist if a DC offset was not present. An asymmetry of the observed light is shown in temporal transmission 16, which will be detected by an observer in the form of undesirable flicker.

In the previous discussion, description of the effect of DC offset is typical of a LC display utilizing a nematic LC material. There are many other types of LC materials, i.e., ferroelectrics, cholesterics, for which the presense of a DC offset may have similar or different effects on the observed intensity.

It is often necessary to correct for the presence of the DC offset by making changes in the fabrication of the LCD device, or by altering the drive waveform. However, the most common way to measure the DC offset is with the finished LCD device. Although this prior art method allows for a statistical determination of the distribution of DC offset for a sample of manufactured devices, there has not been a known way to measure parameters of the LCD device during fabrication that can be used to assess the DC offset that can be expected when the LCD device is completed. To solve this fundamental problem, methods and apparatus for predicting the intrinsic DC offset in a LCD device were disclosed in co-pending, commonly assigned U.S. patent application Ser. No. 09/863,212 entitled "Method and Apparatus For Predicting DC Offset Potential In a Liquid Crystal Display (LCD) Device," filed concurrently with this application.

A typical prior art technique for minimizing DC offset, commonly used in transmissive displays, is to fabricate both the upper and lower assemblies equivalently. Typically, Indium-Tin-Oxide (ITO) is used for the electrodes and the same alignment layers are fabricated on both the upper and lower substrates. This technique has been found to produce very low or zero DC offset displays. In the case of reflective displays, it is difficult to manufacture the upper and lower assemblies equivalently by using identical materials for the electrodes and corresponding layers in between the electrodes and LC material.

Prior art attempts at solving the problem of intrinsic DC offset in reflective type LCD devices have not been effective. A prior art attempt at minimizing the DC offset potential in a reflective type of LCD device is U.S. Pat. No. 5,764,324, Lu et al., "Flicker-Free Reflective Liquid Crystal Cell," [Lu] teaches the minimization of intrinsic DC offset potential by coating the reflective electrode on the lower substrate with a layer of ITO, which is the same electrode material used for the upper electrode in the LCD device. The purpose is to minimize the difference in work function between the two electrodes. Lu's method has two key limitations. The first is that the DC potential that will exist in the finished LCD device is not dependent solely on the work function of the two electrodes, but rather on the surface potential of the combined layers that are used in the fabrication of the LCD assembly. This is especially true if the cell construction above the ITO layer is not symmetric. For example there may be a passivation layer, such as $SiO_2$, on top of one of the ITO layers to prevent against short circuits between the top and bottom electrodes. Secondly, in many specific LCD devices, coating the reflector layer with ITO is not technically feasible due to inter-pixel shorts, or is cost prohibitive. What is lacking in the art are methods of adjusting the difference in the surface potential between the lower and upper assemblies of an LCD device and LCD devices that have reduced or zero DC offset potential, especially for nonsymmetrical LCD devices which are required in reflective LCD designs.

SUMMARY OF THE INVENTION

A liquid crystal display device in one embodiment, of the present invention, includes: an upper electrode; a lower electrode; an alignment layer in contact with either of the upper electrode or the lower electrode to form a lower assembly and an upper assembly; and a liquid crystal display material, disposed between the upper assembly and the lower assembly; wherein a measured surface potential difference between the upper assembly and the lower assembly is adjusted such that an intrinsic DC offset potential in the liquid crystal display device is reduced.

A method, in one embodiment, of measuring a surface potential of an assembly of a liquid crystal display device includes: connecting a reference terminal of an electric field measuring device (EFMD) to an electrode of the assembly of the liquid crystal display device; placing a measurement probe of the EFMD proximate to a surface of the assembly of the liquid crystal display device; and measuring the surface potential of the assembly of the liquid crystal display device with the EFMD.

In yet another embodiment, of the present invention, several methods for adjusting an intrinsic DC offset potential in a liquid crystal display device are taught. One such method includes the steps of: treating at least one electrode, of the liquid crystal display device, such that a surface potential difference between a lower assembly and an upper assembly, of the liquid crystal display device, is reduced and the intrinsic DC offset potential is reduced.

A method, in one embodiment, of reducing an intrinsic DC offset potential in a liquid crystal display device, includes selecting material for a lower electrode and an upper electrode, of the liquid crystal display device, such that a surface potential difference between a lower assembly and an upper assembly, of the liquid crystal display device, is adjusted and the intrinsic DC offset potential in the liquid crystal display device is reduced.

Another method, in one embodiment, of adjusting an intrinsic DC offset potential in a liquid crystal display device includes: selecting passivation layer material; and disposing passivation layer material on an electrode, of the liquid crystal display device to form an assembly; wherein a surface potential of the assembly, after the disposing of passivation layer material, is altered; such that a surface potential difference between a lower assembly and an upper assembly, of the liquid crystal display device, is reduced and the intrinsic DC offset potential in the liquid crystal display device is reduced.

Still another method of adjusting an intrinsic DC offset potential in a liquid crystal display device, includes: selecting alignment layer material; and disposing alignment layer material on an electrode, of the liquid crystal display device to form an assembly; wherein a surface potential of the assembly after the disposing alignment layer material, is altered; such that a surface potential difference between a lower assembly and an upper assembly, of the liquid crystal display device, is reduced and the intrinsic DC offset potential in the liquid crystal display device is reduced.

Another method, of adjusting an intrinsic DC offset potential in a liquid crystal display includes: selecting material for at least one alignment layer to be disposed on an electrode of a lower assembly of the liquid crystal display device; and selecting material for at least one alignment layer to be disposed on an electrode of an upper assembly of the liquid crystal display device, such that a surface potential difference between the lower assembly and the upper assembly, of the liquid crystal display device, is reduced.

Still another method according to the present invention, of adjusting an intrinsic DC offset potential in a liquid crystal display device, includes treating at least one alignment layer, of the liquid crystal display device, such that a surface potential difference between a lower assembly and an upper assembly, of the liquid crystal display device, is reduced.

Yet another method according to the present invention, of adjusting an intrinsic DC offset potential in a liquid crystal display device, includes increasing the thickness of at least one layer, applied to an electrode of the liquid crystal display device, such that a surface potential difference between a lower assembly and an upper assembly, of the liquid crystal display device, is reduced.

BRIEF DESCRIPTION OF THE DRAWINGS

The present invention is illustrated by way of example and is not limited in the figures of the accompanying drawings, in which like references indicate similar elements.

DETAILED DESCRIPTION

Figure 1:
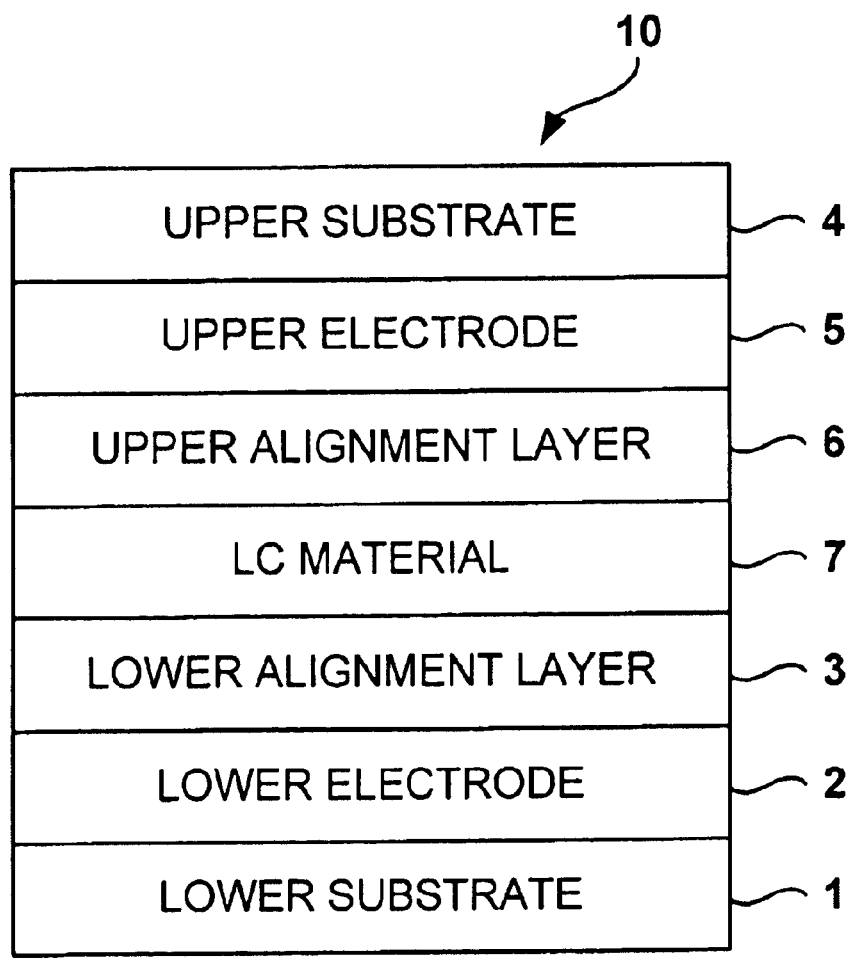
FIG. 1 shows a cross-sectional view of the basic components of an LCD device.

A cross section of a typical LCD device is shown in FIG. 1, where a LCD layer is positioned with adjoining; alignment layers, electrodes, and mechanical substrates.

With reference to FIG. 1, liquid crystal display device 10 may be viewed from above, or observed by looking down through upper substrate 4, in order to see LCD material 7, where information is displayed. Upper substrate 4 may be made of glass or plastic. LCD devices can be classified as transparent or reflective. Depending on the type of display, lower substrate 1 may be transparent, as in a back-lit laptop display, or opaque such as in a reflective display. For reflective displays, lower substrate 1, can also be made from glass, silicon, or any other material that can serve as a suitable support for LC material 7, such as glass or plastic.

An electrode is typically fabricated on each substrate. Typically, in between each electrode is an alignment layer. The alignment layers are typically organic layers which are either treated mechanically or optically to provide the LC material with orientation and anchoring at each end of the LCD device. A typical material for the alignment layers is polyimide, which is commercially available from many suppliers such as NISSAN Chemical, Inc. Thus, lower electrode 2 is connected with lower substrate 1 and lower alignment layer 3. Lower alignment layer 3 is connected with LC material 7. On the upper side of LC material 7, upper substrate 4 is connected with upper electrode 5. Upper electrode 5 is connected with upper alignment layer 6 and upper alignment layer 6 is connected with LC material 7. A LCD device functions by applying a voltage across LC material 7.

There are differences in the typical construction and operation of the cell of a reflective LCD device as compared with the cell of a transparent LCD device. The cell of the LCD device will be considered to include the electrodes and all layers disposed between the electrodes.

Figure 1A:
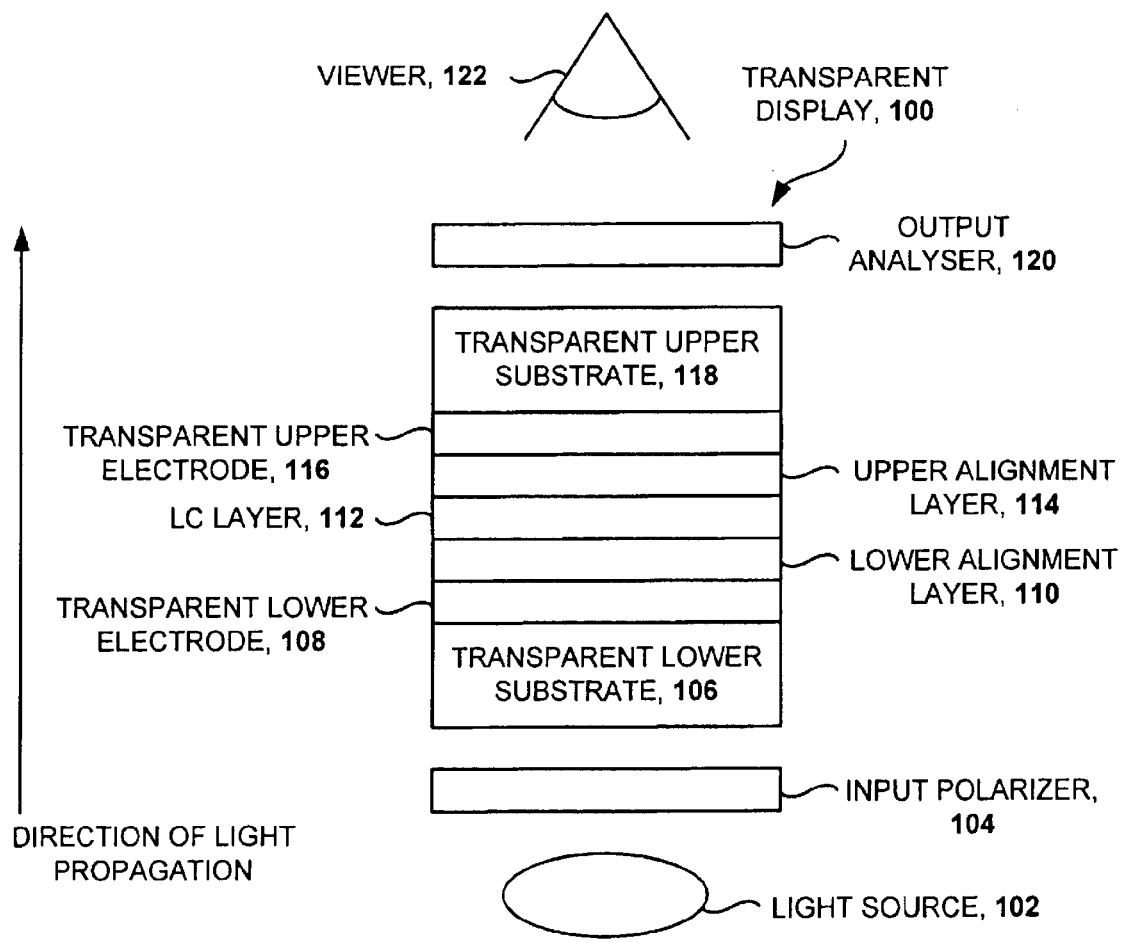
FIG. 1a shows a basic transparent LCD device.

With reference to FIG. 1a, the operation of a typical transparent LCD device is described. Unpolarized light is incident from the bottom of transparent display 100, emanating from light source 102. The light first passes through input polarizer 104. Typically, input polarizer 104 is a linear polarizer, and thus the light incident on transparent lower substrate 106 is linearly polarized. The polarized light then propagates through transparent lower substrate 106, which is typically made from glass, but may be made from plastic or other suitable materials, which do not change the polarization state of the light. The polarized light then propagates through transparent lower electrode 108, lower alignment layer 110, and interacts with LC layer 112. After propagating through LC layer 112, the light then passes through transparent upper alignment layer 114, transparent upper electrode 116, and transparent upper substrate 118. The light then passes through output analyzer 120, which is typically a second polarizer and is viewed by viewer 122.

There are many types of LC materials and several LC Electro-optic (EO) effects that can be used for LC layer 112. These include modes such as twisted nematic (TN) and electrically controlled birefringence (ECB). It is important to note that each of the EO effects, in combination with a voltage applied across the LC layer by the electrodes, can be used to change the state of polarization of the light passing through the LC layer. In a typical TN cell, when no voltage is applied, the polarization state of the incident light is rotated by 90 degrees upon propagating through the cell. When the maximum voltage is applied, no change in the polarization state occurs.

In the example of a TN cell, analyser 120 would be a second linear polarizer. The orientation of this polarizer depends on the LC material used, and the choice of the display mode. For example, in a typical normally white TN cell, output analyser 120 would be oriented with its polarization axis rotated 90 degrees with respect to the orientation of input polarizer 104. Thus, with no voltage applied to a TN cell, the input light is rotated 90 degrees on passing through the cell and then is transmitted through output analyser 120 with little additional attenuation. Viewer 122 sees a bright or "on" display. If a voltage is applied to the cell, the incident light is not rotated by the TN cell, and the light is then absorbed by output analyser 120 and the viewer sees a dark, "off", or black display.

Figure 1B:
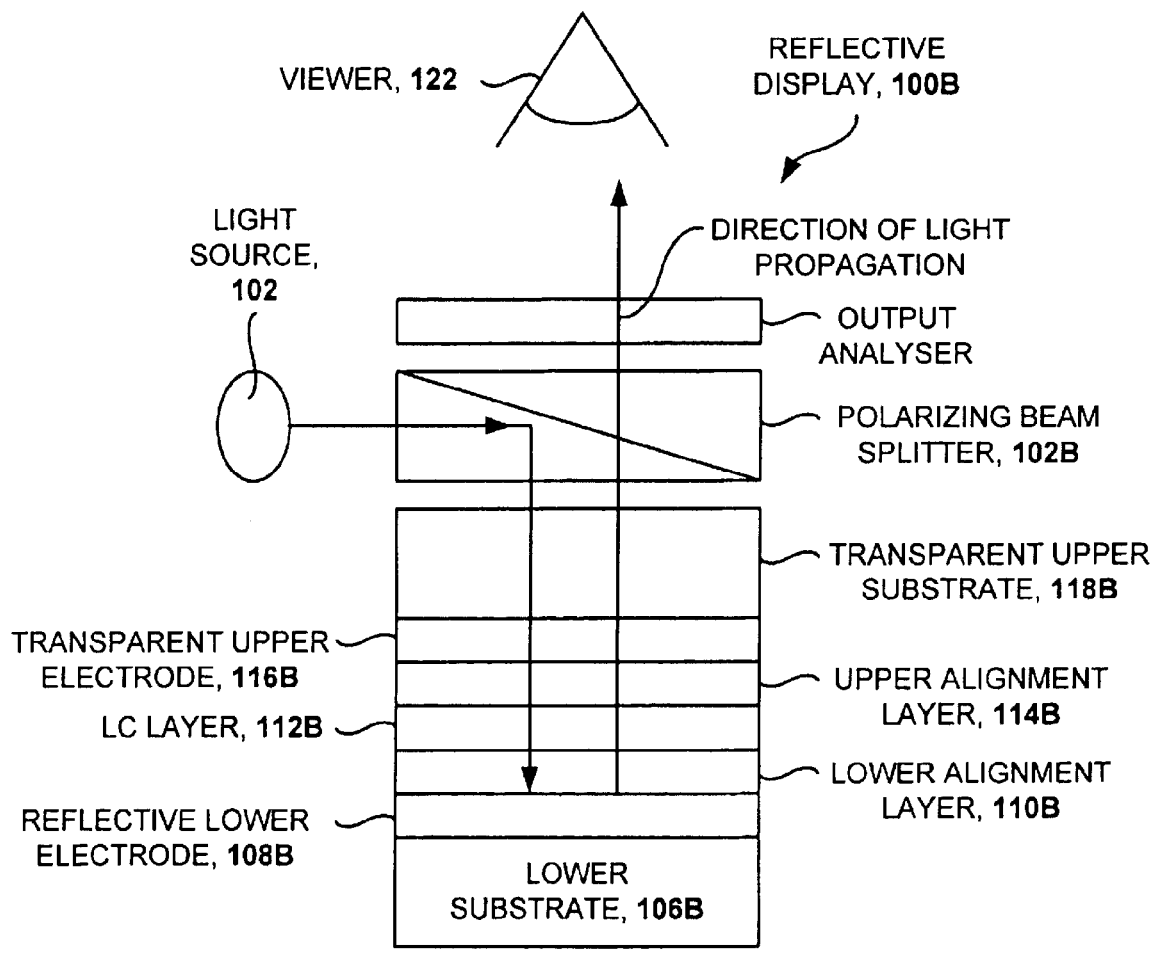
FIG. 1b shows a basic reflective LCD device.
Figure 2:
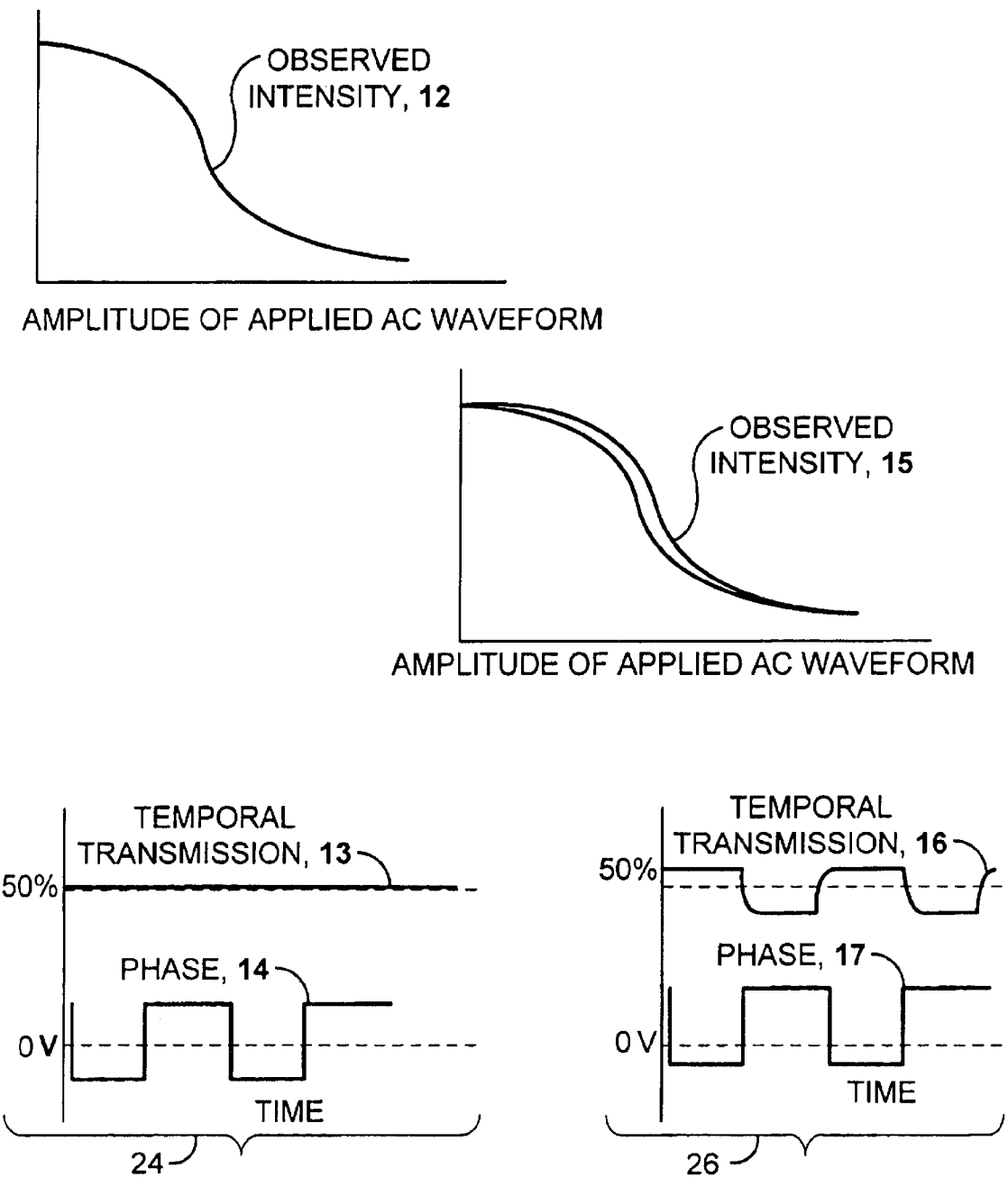
FIG. 2 shows some of the characteristics of a LCD device with and without intrinsic DC offset.

There are differences in the typical construction and operation of the cells for reflective and transparent LCD devices, as was previously mentioned. With reference to FIG. 1b, the operation of a typical reflective LCD device is described. Light is incident from the side of reflective display 100b, emanating from light source 102. The light passes through an input polarizer. For the display shown in FIG. 1b, the input polarizer is shown as polarizing beam splitter 102b which has the advantage of linearly polarizing the input light and reflecting it by 90 degrees, thus coupling the light into transparent upper substrate 118b. Next, the light propagates through transparent upper electrode 116b and upper alignment layer 114b. The light then propagates through LC layer 112b, where the state of polarization may be changed and then passes through lower alignment layer 110b. The light is then reflected off of a lower reflector. Typically, the lower reflector is implemented as reflective lower electrode 108b, made from a material such as aluminum. The light then propagates a second time through lower alignment layer 110b, LC layer 112b, upper alignment layer 114b, transparent upper electrode 116b, and transparent upper substrate 118b. The light then passes through polarizing beam splitter 102b a second time, which is now acting as the output analyser. Again, the viewer will see a bright or a dark display depending on whether a voltage is placed across LC layer 112b by the two electrodes, 108b and 116b.

For reflective displays, several of the fabrication requirements can be quite different compared to transmissive displays. The lower substrate, although it may be glass, may be a non-transmissive material such as a silicon wafer or integrated circuit. The lower electrode no longer needs to be transparent, thus many different metals can be used. Since the light passes through LC layer 112b twice, it is important to note that even for displays described as TN or ECB, the actual LC cell construction must be different from an equivalent transmissive display because of the effect of two passes through the LC layer on the polarization state of the light.

The choice of electrode material is determined by the design of the LCD device. For back-lit transparent displays, both electrodes must be transmissive to visible light. An example of a suitable transparent electrode material is ITO.

When the display is operated in a reflective mode, lower electrode 2 can be a reflecting conductor such as aluminum or chrome, or a combination of materials such as alloys or multi-layer metal and dielectric structures.

It will be appreciated by those of skill in the art that many additional components may be added to the structure, shown in FIGS. 1, 1a, and 1b, such as passivation layers, planarization layers, color filter layers, and other components, which may effect the fabrication and operation of the LCD device. However, the method of measuring the intrinsic DC offset potential that will result in the finished LCD device will apply equally to all such combinations of structures.

As taught in "Method and Apparatus For Predicting DC Offset Potential In a Liquid Crystal Display (LCD) Device," the surface potential of the assembly of layers that contact the LC material is a controlling parameter for predicting intrinsic DC offset potential within a finished LCD device. Specifically, the DC offset potential that will exist in a finished LCD device can be predicted before the LCD device is finished by making non-contacting measurements of the surface potential of the upper and lower assemblies of the LCD device. The difference in surface potentials so measured, or surface potential difference, predicts the intrinsic DC offset potential that will exist in the finished LCD device.

Figure 3:
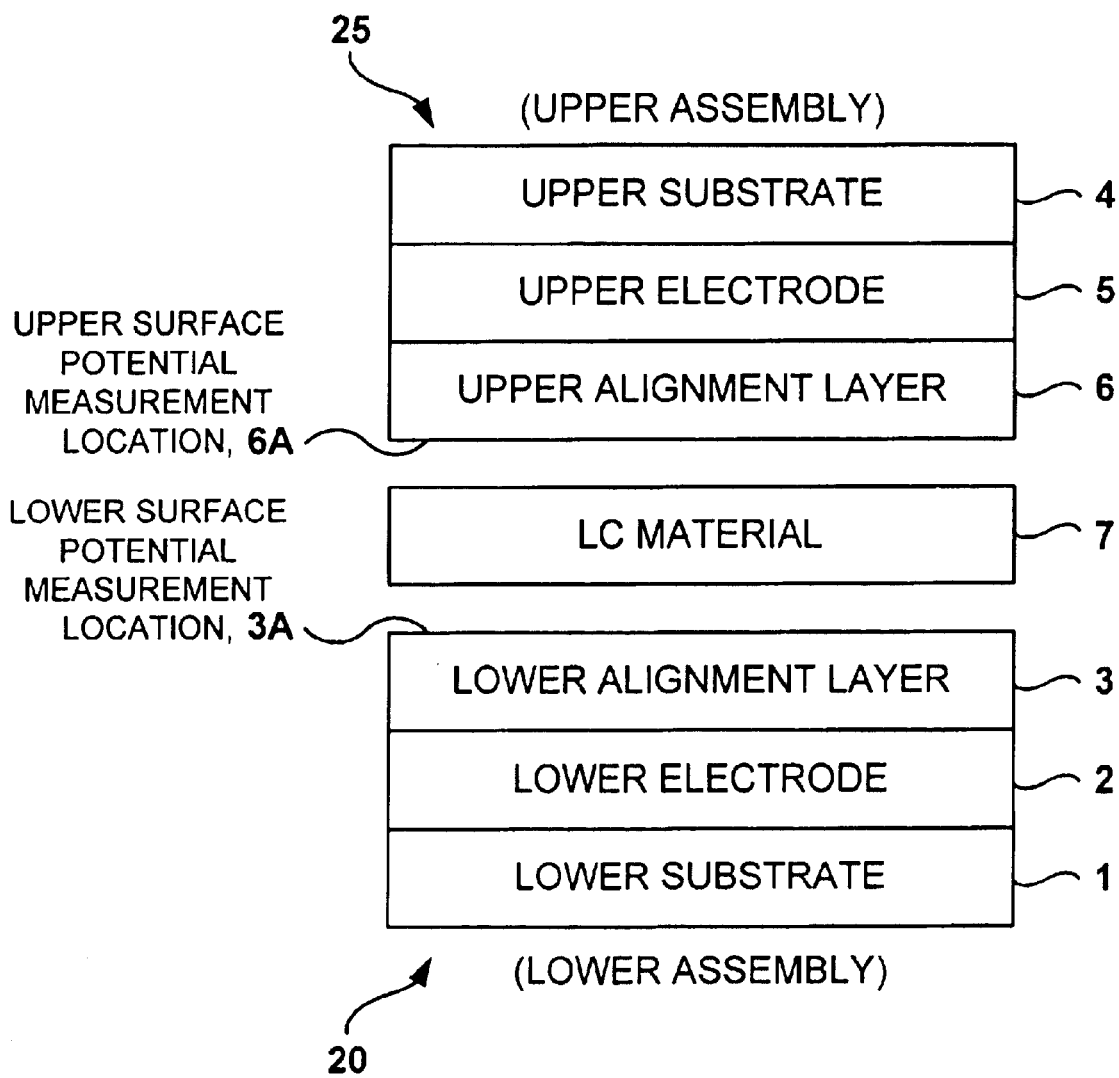
FIG. 3 indicates the upper and lower assemblies of a LCD device and shows where the surface potentials of the assemblies are measured.

To determine the DC offset potential that will occur in a finished LCD device it is necessary to accurately measure the surface potential of the two complete assemblies just prior to assembly and filling with LC material 7. FIG. 3 indicates the upper and lower assemblies of a LCD and shows where the surface potentials of the assemblies are measured. With reference to FIG. 3, lower assembly 20 includes lower substrate 1, lower electrode 2, and lower alignment layer 3. The surface potential of lower assembly 20 is measured at measurement location 3a, which is the surface of lower alignment layer 3 that will make contact with LC material 7 in the finished LCD device. In a similar manner, upper assembly 25 includes upper substrate 4, upper electrode 5, and upper alignment layer 6. The surface potential of upper assembly 25 is measured at measurement location 6a, which is the surface of upper alignment layer 6 that will make contact with LC material 7 in the finished LCD device.

In practice, the surface potential is likely to vary over the surface of the upper or lower assembly. Therefore, it may be necessary to take several measurements of the surface potential and compute an average for an assembly.

Figure 3A:
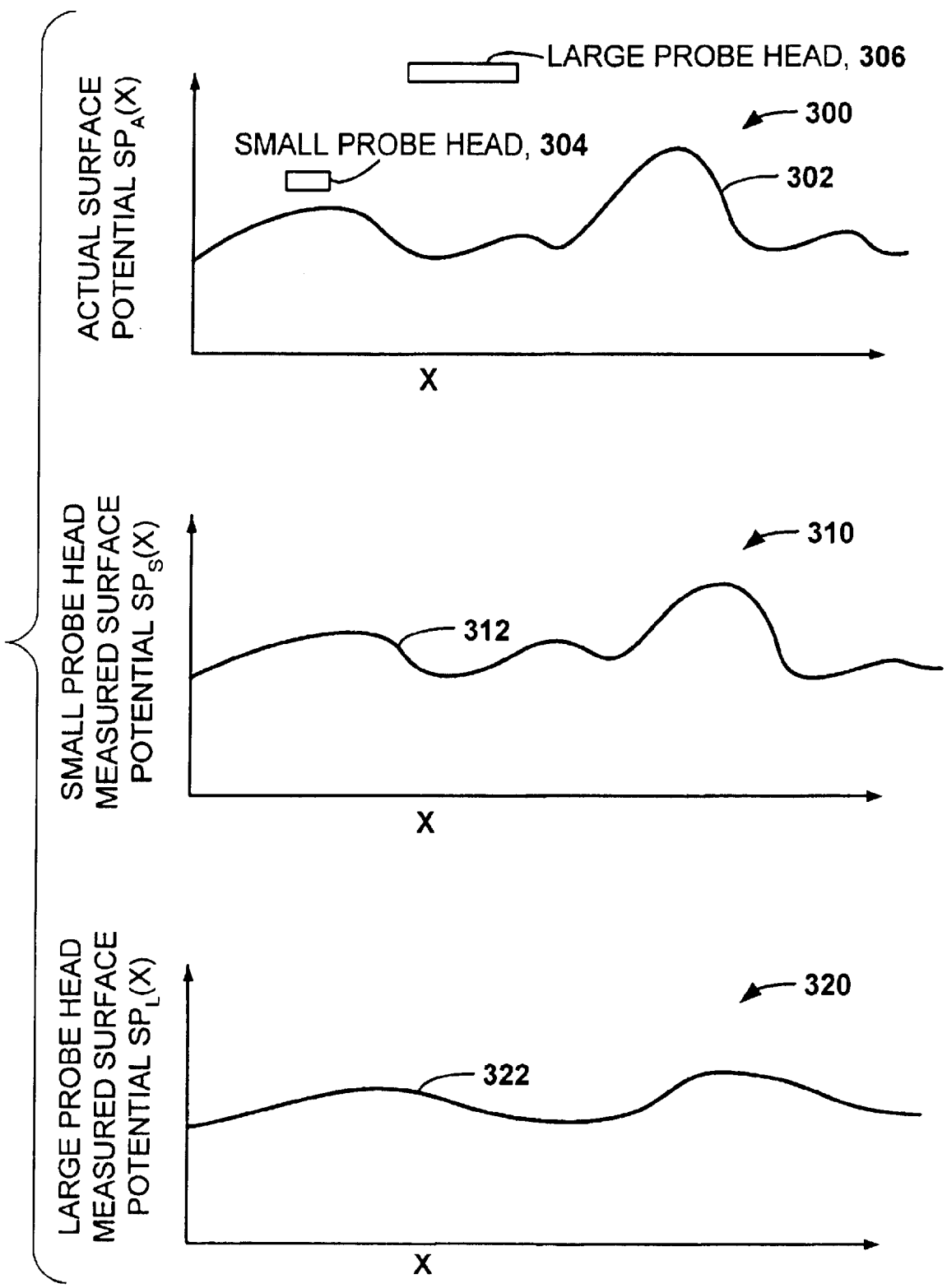
FIG. 3a shows the effect of probe head size on the measured surface potential.

Additionally, the accuracy of the measured surface potential of an assembly, as compared with the actual surface potential of an assembly, will vary according to the properties of the measurement system employed. FIG. 3a depicts the spatial filtering that occurs due to averaging, resulting from the probe head's width. With reference to FIG. 3a, actual surface potential distribution $SP_A(X)$ 300 is shown for a possible surface to be measured. This surface distribution may be measured with small probe head 304 or large probe head 306. The result of measuring surface potential distribution 300 with small probe head 304 is shown in small probe head measured surface potential $SP_s(X)$ 310 as curve 312. The result of measuring actual surface potential distribution 300 with large probe head 306 is shown in large probe head measured surface potential $SP_L(X)$ 320 as curve 322.

Small probe head 304 filters actual surface potential distribution 300, curve 302, less than large probe head 306. Thus, a more accurate measurement of actual surface potential distribution 300 is obtained with small probe head 304. This phenomenon of averaging is applicable to measurement systems of this type and should be noted by those skilled in the art when attempting to measure the surface potential distribution of a surface. It should be noted that in order to obtain a more accurate measurement of the actual surface potential $SP_A(X)$ 302, a point sensor would be required. However, in practice a suitable approximation may be achieved with a probe head whose width is chosen small enough relative to the fluctuations of the surface potential to be measured. Probe heads of decreasing size may be used until the measurements converge, thereby arriving at the proper probe head size.

As mentioned above, averaging measurements made at several points on a surface is usually sufficient to obtain the necessary reading of the surface potential.

Large displays may have a pixel size and a display size that are large relative to the sampling size of the probe head. In this case, it is possible to measure individual pixels directly and average over several pixels, as described in the preceding paragraphs, to obtain an estimate of the DC offset for the display.

For the case of a display where the pixels are much smaller than the smallest practical probe head, but the active area of the display containing all the pixels is larger than the probe head, then one may make a measurement of several pixels thereby measuring the average surface potential of several pixels, including inter-pixel areas separating active pixels which may be fabricated with different materials than the pixels and hence have a different surface potential, and use this measurement to estimate the DC offset of the display. In some instances, it may be necessary to compare the surface potential measurements with the actual DC offset measurements made on completed operating displays, and then re-scale the surface potential measurements to account for the influence of the inter-pixel areas.

Where both the size of the pixels and the size of the active area containing the pixels is smaller than can be accurately measured with available probe heads, there may be areas around the periphery of the active area where a measurement of the surface potential would be representative of the surface potential of an actual pixel. In this case, measurements of this area of a layer would be used to estimate the DC offset potential.

Several display assemblies, each of which may be too small to be measured directly, and where there is no available area on the periphery of the individual displays to be measured, may be manufactured together on a larger substrate, such as the case for Liquid Crystal on Silicon based LCD displays in which several display active matrix assemblies are fabricated simultaneously on a single Silicon wafer. In this case, there may be areas on the periphery of the wafer, which are representative of the DC offset of the pixels, and can be used to estimate the DC offset of all the displays from the specific wafer.

Finally, it may be impossible to make a direct measurement on a pixel, display, or substrate, in which case it has been shown that it is possible to fabricate test structures, of a size suitable for measurements with an existing probe head, that are fabricated with the same materials and processes such that the surfaces measured with an EFMD give surface potential measurements that are equivalent to those that would be measured on a pixel, display or substrate if they were or the appropriate size.

Figure 4:
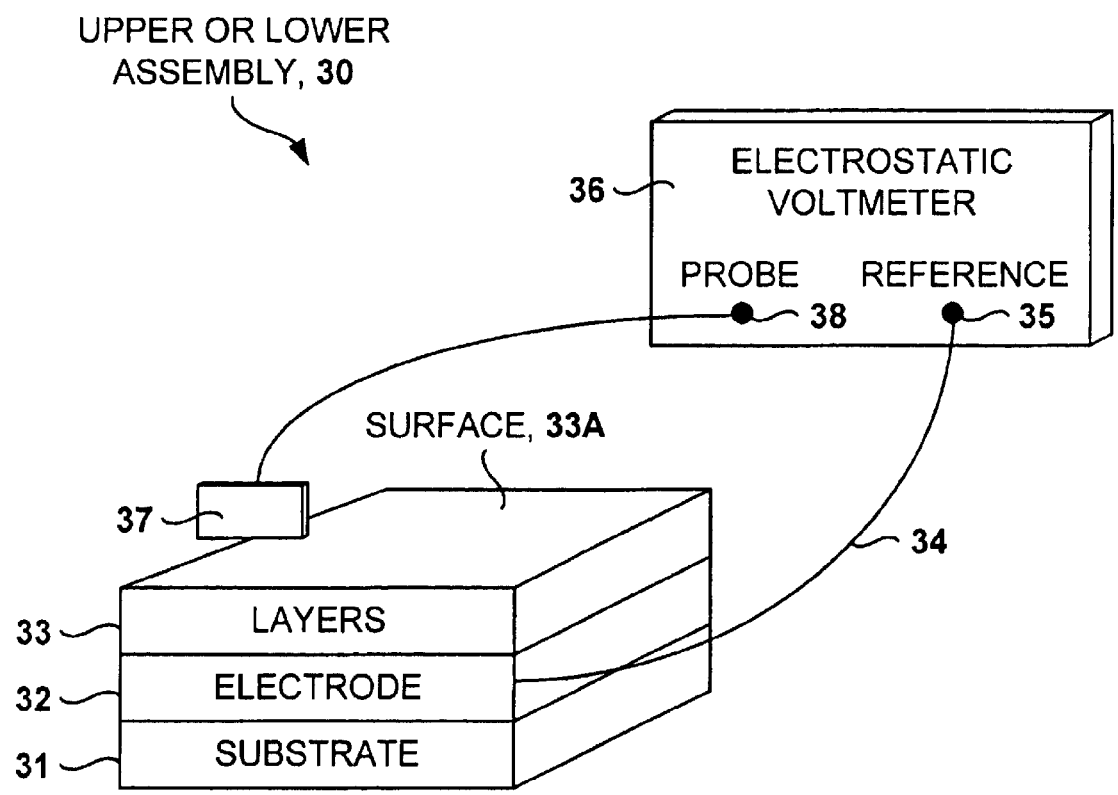
FIG. 4 depicts the configuration of the experimental test equipment used to predict the intrinsic DC offset potential in a LCD device.

FIG. 4 depicts the configuration of the experimental test equipment used to predict the intrinsic DC offset potential in a LCD device. With reference to FIG. 4, LCD assembly 30 is shown ready for the surface potential measurement. LCD assembly 30 is either the lower or upper assembly that will be used to create the finished LCD device. Assembly 30 includes all the layers that will contact one side of LC material 7 (FIG. 3), such as substrate 31, electrode 32, and layers 33 (FIG. 4). An EFMD such as a non-contacting electrostatic voltmeter may be used to make the surface potential measurements. Reference connection 35, of electrostatic voltmeter 36, is connected to electrode 32 with lead 34. To ensure an accurate measurement, a good low resistance electrical contact should be made with electrode 32. If contact is made to layers 33 on top of electrode 32 the measurement may not be accurate. Probe head 37 is connected to probe connection 38 of electrostatic voltmeter 36. Probe head 37 is placed proximate to surface 33a. A preferred distance is in the range of 0.1–2.0 millimeters. Suitable distances depend on the characteristics of the specific measurement desired and the measurement instrument. This distance can be chosen on the basis of the accuracy and repeatability of the measurement, as well as the desire not to touch or otherwise damage the substrate prior to fabrication into the LCD device. The value of the measured surface potential is then recorded. The surface potential measurement is then made for the other assembly that will form the finished LCD device. The magnitude of the difference between the surface potential measurements for the upper and lower assemblies of the LCD device is the magnitude of the DC offset potential that will be present when the assemblies are assembled and filled with LC material. Because electrostatic voltmeter measurements typically vary with distance, it is important that both surfaces be measured at very nearly the same separation distance between probe head and surface.

Typical electrostatic voltmeters usually measure the surface potential of an assembly with reference to an internal standard, or to an external reference or a value selected by the user, and as such make a relative measurement. It is important that the user of such a device be aware of the implications of making such a relative measurement. For example, when calculating the difference in the surface potential of two assemblies, the relative value cancels out. Therefore there is no implication to the relative measurement except that both assemblies must be made with respect to the same reference. However, when making a comparison of the absolute surface potential of difference assemblies, for instance when defining a potential as "positive" or "negative" it is important to take into account the measurement is with respect to a reference. For a typical EFMD, the internal standard, which is used as a reference, is approximately the surface potential of gold. A non-contacting electrostatic voltmeter such as the Model 320B manufactured by Trek Instruments, Inc. provides sensitive measurement of the electrostatic potential of surfaces in the typical range of interest for LCD devices (±10 volts).

The advantages of this test setup and technique are that an assessment of the intrinsic DC offset in an LC cell can be made prior to fabrication of the device. Because this method is non-contacting, it does not damage the substrate in any way that would prevent the fabrication or proper function of a working LCD device. Since the thickness of the LC gap of the assembled display, which is subsequently filled with LC material is typically between 1 and 10 micrometers, it will be apparent to those of skill in the art that this method avoids contamination by particles that may be deposited by contact or other damage that might occur during other forms of testing. Such contamination or damage is undesirable.

Figure 5:
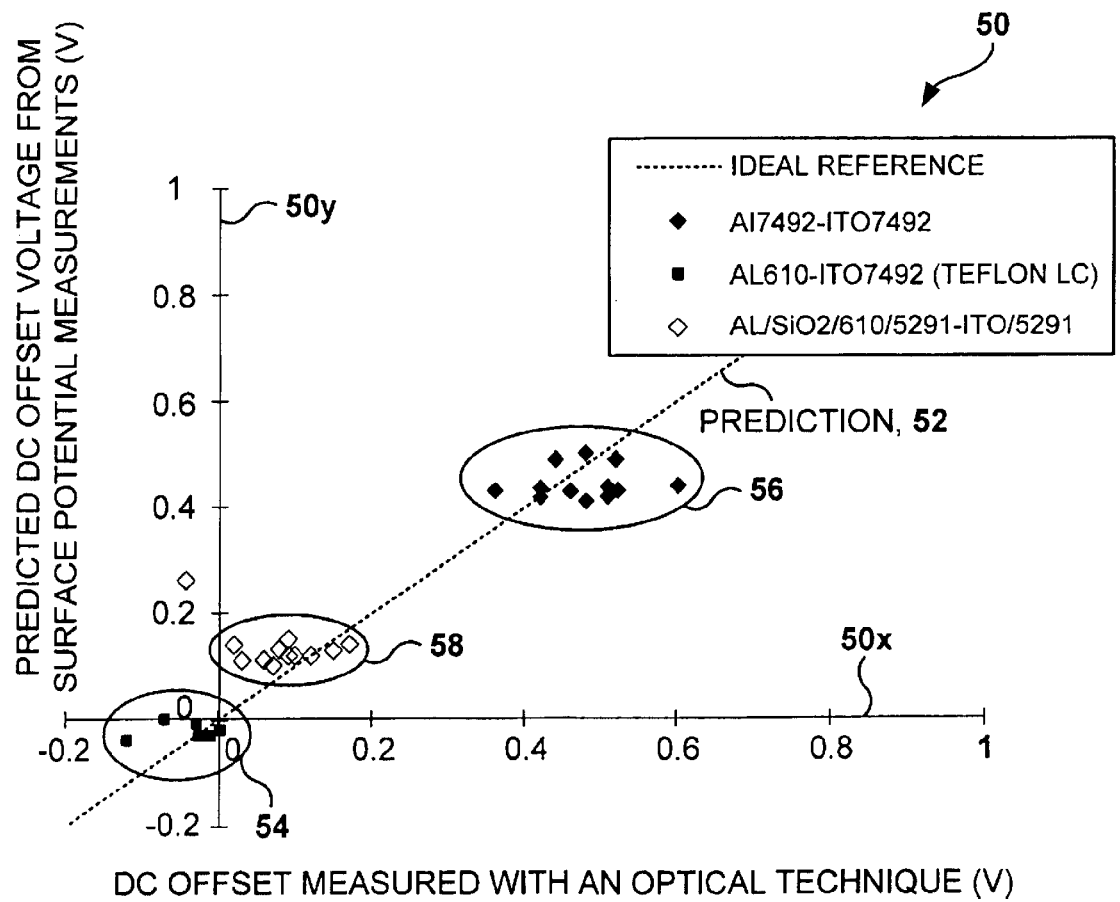
FIG. 5 is a plot of predicted DC offset potential verses measured DC offset potential in two different LCD devices.

FIG. 5 is a plot of predicted DC offset potential, as measured with the disclosed methods and apparatus prior to LCD assembly, verses measured DC offset potential of the completed LCD device using optical measurement techniques for three different LCD devices. With reference to FIG. 5, comparison 50 plots predictions 52 of several displays for three specific LCD device designs. Predicted DC offset 50$x$, as predicted by the disclosed methods and apparatus, is plotted on the x-axis. Actual DC offset 50$y$, measured optically, is plotted on the y-axis. Prediction 52 results in points that lie on a line of slope 1 because by definition the measured DC offset and the predicted DC offset for the measured surface potentials should be the same value. Ideally, all measured points should lie on a slope of 1.

Figure 6:
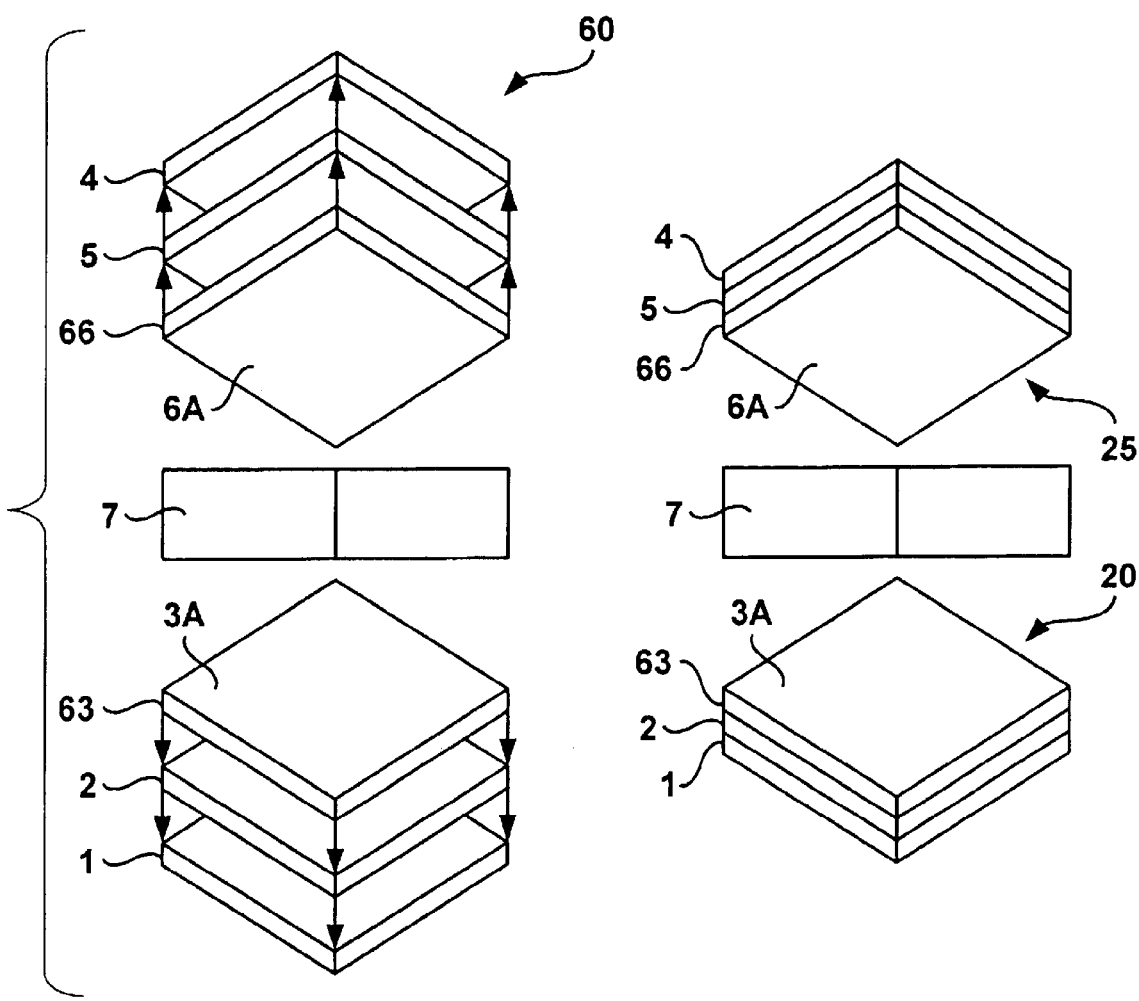
FIG. 6 is a view of a LCD device showing the surfaces of the upper and lower assemblies on which the surface potentials will be measured

The technique previously described, for measuring the surface potential of an assembly of a LCD device during manufacture, is useful for building LCD devices with minimized DC offset potential or LCD device with DC offset potential within a range for a given LC design (a designed range). FIG. 6 is a view of a LCD device showing the surfaces of the upper and lower assemblies on which the surface potentials will be measured prior to assembly. With reference to FIG. 6, LCD exploded view 60 indicates the fabrication of successive layers by the use of arrows on upper electrode 5, indicating the deposition of upper electrode 5 onto upper substrate 4 and upper layers 66 onto electrode 5, which forms upper assembly 25. The surface potential of upper assembly 25 is measured at measurement location 6a. The lower assembly is fabricated by depositing lower electrode 2 onto lower substrate 1 and lower layers 63 onto lower electrode 2. The surface potential of lower assembly 20 is measured at measurement location 3a.

In one embodiment, of the present invention, electrode materials may be selected so that the surface potential difference between the upper and lower assemblies is reduced. Electrodes are selected for which the surface potential difference is small. Those of skill in the art will recognize that the surface potential of a metal used for an electrode is different than the ideal work function of the electrode. References such as CRC, Handbook of Chemistry and Physics Vol. 64, pages 76–77, list typical values for the work function of various metals commonly used as electrodes in LCD devices. Most metals, used for the fabrication of LCD device electrodes have native oxides or other layers formed on their surface due to processing. Thus, the measured surface potential of the metal is different than the value for the work function that would be listed in a reference table.

Figure 7:
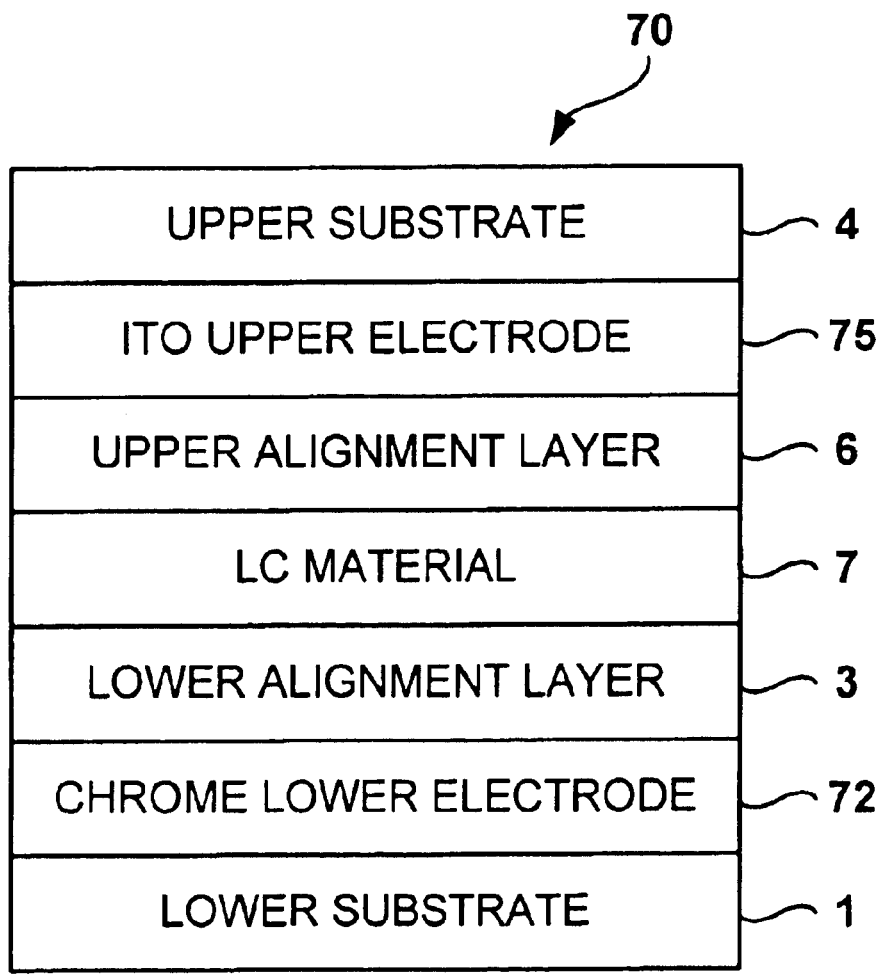
FIG. 7 shows a LCD device in which electrodes have been selected to provide similar surface potentials in order to minimize the surface potential difference within the LCD device.

In one embodiment, it has been found that when using Aluminum (Al) and ITO as the electrodes in an LCD device the surface potential difference is approximately 1.2 volts. Thus, the LCD device fabricated with identical alignment layer material on these electrodes, will have a large intrinsic DC offset that may exceed an acceptable design range for the LCD device. FIG. 7 shows an LCD device in which electrodes have been selected to provide similar surface potentials in order to minimize the surface potential difference within the LCD device. With reference to FIG. 7, LCD device 70 is fabricated with chrome lower electrode 72 and ITO upper electrode layer 75. If lower alignment layer 3 is fabricated with the same material as upper alignment layer 6 the resulting intrinsic DC potential difference in the finished LCD device would be reduced from 1.2 volts to less than 0.1 volts which may be within an acceptable designed range for some LCD devices.

According to another embodiment, of the present invention, the surface potential of an assembly can be increased or decreased to adjust the DC offset in an LCD device. For the purpose of this discussion, a change in surface potential that results in the surface potential moving in the positive direction, or becoming less negative with respect to the selected reference value of the measuring device, will be referred to as an increase in surface potential. Conversely, a change in surface potential, making the surface potential more negative or less positive with respect to the selected reference value of the measuring device, will be referred to as a decrease in surface potential. This choice is arbitrarily made and could have been stated differently with no effect on the present invention. The choice simply establishes a reference frame from which to discuss changing the surface potential.

Returning to the example of Al and ITO electrodes, the surface potential of the Al electrode can be decreased, made less positive, and the surface potential of the ITO can be increased, made less negative, in order to achieve the desired result of minimized DC offset potential. It is often desirable to use Al as the reflecting electrode and ITO as the transparent electrode for ease of fabrication and cost reduction in an LCD device. In this case, coating one or both of the electrodes with a passivation layer can reduce the large surface potential difference between Al and ITO. Passivation layers are nominally insulating layers made from a variety of materials. Examples of suitable passivation layers are, BCB planarization layer supplied by Dow Chemical Company, spun-on-glass supplied by Nissan Chemical as NHC (Nissan Hard Coat), MgO, and various insulating layers made from materials such as $SiO2$, $Al_2O_3$, $SiN_2$, $MgF_2$, $MgAl_2O_4$. Evaporation, sputtering, spin-coating, roller-coating, meniscus coating, chemical vapor deposition (CVD), and plasma-enhance CVD as well as other fabrication techniques can be used to fabricate these layers.

The addition of passivation layer $SiO_2$ to the Al electrode decreases the surface potential from 0.2 volts to approximately −0.48 volts for a typical assembly as measured with a Model 320B using the internal standard. The addition of alignment layer 7492 on top of passivation layer $SiO_2$ increases the surface potential of ITO to −0.23. The finished LCD device, according to this construction, using the same alignment layer on both substrates will have a surface potential difference of −0.24 volts, which is reduced compared to the initial value of approximately 0.6 volts and may be within an acceptable designed range for some LCD devices. An exemplary range for the surface potential difference of the LCD previously discussed could be −0.4 volts to +0.4 volts. It will be appreciated by those of skill in the art that an acceptable designed range depends on the particular LCD device under consideration. The range listed above −0.4 volts to +0.4 volts is merely illustrative of one designed range and does not limit the present invention.

Many fabrication techniques exist in the art, as well as other material choices. However, the fabrication technique or the material choice does not limit the present invention.

In another embodiment, of the present invention, different alignment layers can be used to either increase the surface potential of an assembly or decrease the surface potential. Typically, LCD manufacturers use the same alignment layer on both upper and lower assemblies. There are many different alignment layer materials that have been developed for use in LCD devices. These have been found, according to the present invention, to produce different surface potentials when deposited on top of various electrodes or passivation layers. Alignment layer materials are often classified as low or high residual DC (RDC). RDC is an industry measurement of the proclivity of the material to trap ions and thus, for a DC voltage to be built up in the LCD device. Low and high RDC materials have significantly different surface potentials when fabricated on top of electrodes and passivation layers. Two different alignment layers can be selected for their property to modify the surface potential of each assembly in a manner that minimizes the surface potential difference of the two assemblies.

Figure 8:
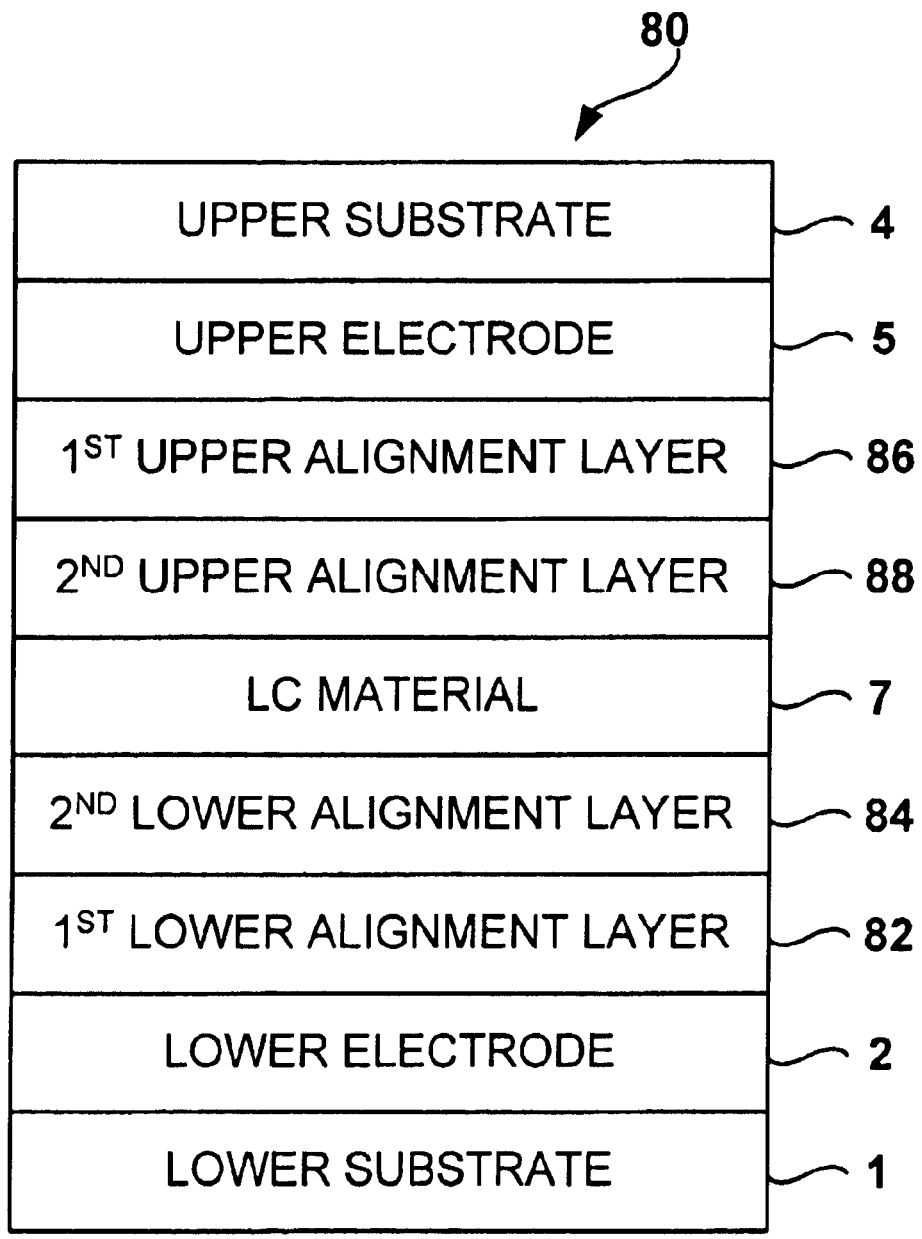
FIG. 8 depicts the cross section of a LCD device employing multiple alignment layers in order to minimize the surface potential difference within the LCD device.

In another embodiment, of the present invention, one or both substrates can be fabricated with more than one layer of alignment material. Although only one layer of alignment material is needed as the final layer in contact with the LCD material to provide the necessary molecular anchoring, it is possible to fabricate a device with a plurality of layers made of alignment material to minimize the surface potential between the upper and lower assemblies of the LCD device. FIG. 8 depicts the cross section of an LCD device employing multiple layers of alignment material in order to minimize the surface potential difference within the LCD device. With reference to FIG. 8, $1^{st}$ lower alignment layer 82 and $2^{nd}$ lower alignment layer 84 may be made from different materials. In like manner, $1^{st}$ upper alignment layer 86 and $2^{nd}$ upper alignment layer 88 may be fabricated from different materials. None of the four alignment layer materials need be the same, the layers may be chosen to provide the desired changes in surface potential of the assemblies prior to completion of the LCD device in order to achieve the minimized DC offset potential in the finished LCD device.

In an alternative embodiment, of the present invention, the electrodes may be treated or processed to either increase or decrease the surface potential of an assembly. One such treatment can be heat treating, which can reduce the surface potential of the electrode. Treating may be performed prior to coating with passivation layers or alignment layers in order to alter the natural oxide layers on the metal. An example of a treatment is the firing of an aluminum electrode in an atmosphere containing $H_2$ and/or $N_2$. This treatment reduces the surface potential difference between Al and ITO. Another example of processing is etching the assembly in an argon. Argon plasma etching can be used to increase the surface potential of an Al electrode.

In another alternative embodiment, of the present invention, the alignment layer may be doped during processing with an ionic salt or other dopant which has the effect of altering the surface potential of the finished assembly so that the surface potential difference of the LCD device is minimized.

Another embodiment, of the present invention, provides for changing the surface potential of an electrode by either increasing or decreasing the thickness of layers applied to the electrode. One example is the application of an MgO layer to an ITO electrode. The uncoated ITO electrode has a measured surface potential of −0.85. MgO may be applied to the ITO electrode with the effect of increasing the surface potential with increasing MgO layer thickness. An MgO layer 1,000 angstroms thick increases the surface potential of the assembly to approximately −0.2 volts. Further increase of the MgO layer to approximately 1,600 angstroms increases the surface potential of the assembly to zero volts.

Figure 9:
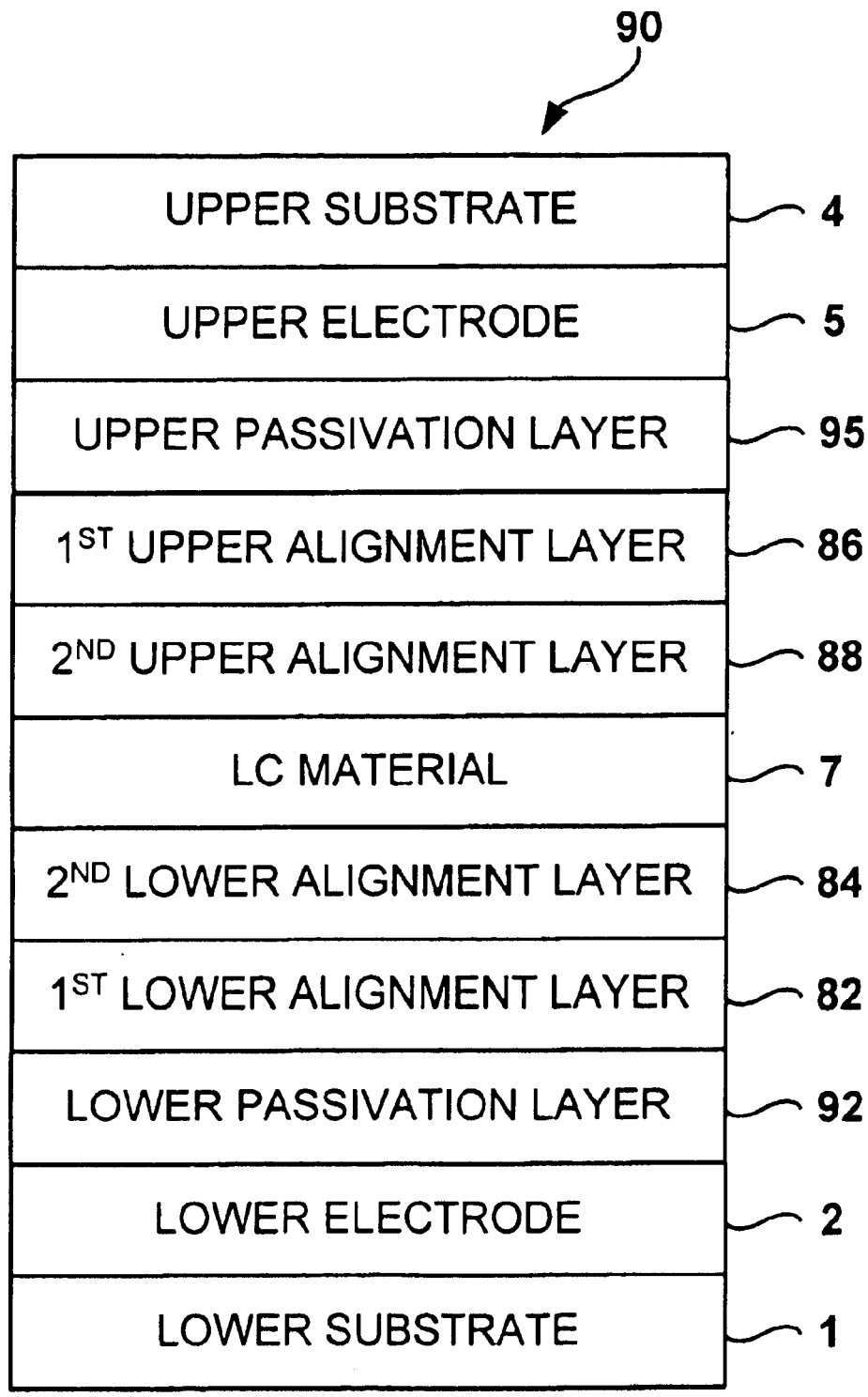
FIG. 9 depicts the cross section of a LCD device employing passivation layers and multiple alignment layers in order to minimize the surface potential difference within the LCD device

It will be noted by those of skill in the art that any of these embodiments may be used singularly or in combination to achieve the desired change in surface potential in an assembly or minimized DC offset potential in the finished LCD device so that the intrinsic DC offset potential falls within the desired designed range. An example of multiple layers of alignment material and different passivation layers can be seen in FIG. 9. FIG. 9 depicts the cross section of an LCD device employing passivation layers and multiple alignment layers in order to minimize the surface potential difference within the LCD device. With reference to FIG. 9, lower passivation layer 92 and upper passivation layer 95 may be fabricated with different materials. Different passivation layer material may be used in combination with multiple layers of alignment material to achieve minimized DC offset potential in the LCD device.

The invention is not limited to typical nematic-filled LC displays. Those of skill in the art will understand the application to other LC based displays. For example, it is possible that use of other electro-optic modulation effects and materials, would display an improved image if the DC offset were to be enhanced (for example in some types of bistable media), in which case the methods described herein to adjust the surface potential difference between and upper and a lower assembly could be used to increase the DC offset potential of the completed display.

In the foregoing specification, the invention has been described with reference to specific embodiment thereof. It will be, however, evident that various modifications and changes may be made thereto without departing from the broader scope and spirit of the invention. The specification and drawings are, accordingly, to be regarded in an illustrative rather than restrictive sense.

What is claimed is:

1. A liquid crystal display device, comprising:
an upper electrode;
a lower electrode;
an alignment layer in contact with said upper electrode and an alignment layer in contact with said lower electrode to form an upper assembly and a lower assembly, respectively; and
a liquid crystal material, disposed between the upper assembly and the lower assembly;
wherein the upper assembly and the lower assembly are designed relative to each other, based on at least one surface potential measurement, to create a substantially predetermined surface potential difference between the upper assembly and the lower assembly;
wherein at least one of said upper electrode and said lower electrode is treated such that a surface potential difference between the lower assembly and the upper assembly, is adjusted and an intrinsic DC offset potential is changed to be within a designed range.

2. A liquid crystal display device, as in claim 1, wherein, at least one of said upper electrode and said lower electrode is treated by firing in an atmosphere selected from the group consisting of H2, N2, and combination H2/N2.

3. A liquid crystal display device, as in claim 1, wherein at least one of said upper electrode and said lower electrode is treated by etching.

4. A liquid crystal display device, comprising:
an upper electrode;
a lower electrode;
an upper alignment layer in contact with said upper electrode and a lower alignment layer in contact with said lower electrode to form an upper assembly and a lower assembly, respectively; and
a liquid crystal material, disposed between the upper assembly and the lower assembly;
wherein the upper assembly and the lower assembly are designed relative to each other, based on at least one surface potential measurement, to create a substantially predetermined surface potential difference between the upper assembly and the lower assembly;
wherein at least one of said upper electrode and said lower electrode is treated such that a surface potential of at least one of said upper electrode and said lower electrode is changed so that an intrinsic DC offset potential in said liquid crystal display device is within a designed range.

5. A liquid crystal display device, comprising:
an upper electrode;
a lower electrode;
an upper alignment layer in contact with said upper electrode and a lower alignment layer in contact with said lower electrode to form an upper assembly and a lower assembly, respectively; and
a liquid crystal material, disposed between the upper assembly and the lower assembly;
wherein the upper assembly and the lower assembly are designed relative to each other, based on at least one surface potential measurement, to create a substantially predetermined surface potential difference between the upper assembly and the lower assembly;
wherein a passivation layer is disposed on at least one of said upper electrode and said lower electrode to form at least one of the lower assembly and the upper assembly wherein a surface potential of an assembly formed thereby is altered, such that a surface potential difference between the lower assembly and the upper assembly is adjusted and an intrinsic DC offset potential in said liquid crystal display device is changed.

6. A liquid crystal display device, as in claim 5, wherein the surface potential of the assembly formed thereby is altered, resulting in a decrease in the surface potential.

7. A liquid crystal display device, as in claim 5, wherein the surface potential of the assembly formed thereby is altered, resulting in an increase in the surface potential.

8. A liquid crystal display device, as in claim 5, wherein a passivation layer is selected from at least one of BCB, NHC, MgO, $SiO_2$, $Al_2O_3$, $SiN_2$, $MgF_2$, and $MgAl_2O_4$ and the passivation layer is disposed on at least one of said upper electrode and said lower electrode to form an assembly, wherein the way the passivation layer is disposed is selected from at least one of sputtering by chemical vapor deposition (CVD), plasma-enhanced CVD, evaporation, spin-coating, meniscus and roller-coating; such that a surface potential difference between the assembly formed thereby and a second assembly of said liquid crystal display device is adjusted.

9. A liquid crystal display device, as in claim 8, wherein the passivation layer is selected and disposed on at least one of said upper electrode and said lower electrode to form the second assembly.

10. A liquid crystal display device, as in claim 1, wherein materials for said alignment layer are selected and disposed on at least one of said upper electrode and said lower electrode to form an assembly wherein a surface potential of the assembly is altered, such that a surface potential difference between the lower assembly and the upper assembly is adjusted and the intrinsic DC offset potential in said liquid crystal display device is changed.

11. A liquid crystal display device, as in claim 10, wherein the surface potential of the assembly formed thereby is altered, resulting in a decrease in the surface potential.

12. A liquid crystal display device, as in claim 10, wherein the surface potential of the assembly formed thereby is altered, resulting in an increase in the surface potential.

13. A liquid crystal display device, as in claim 10, wherein materials selected for said alignment layer disposed on the lower assembly are different.

14. A liquid crystal display device, as in claim 10, wherein materials selected for said alignment layer disposed on the upper assembly are different.

15. A liquid crystal display device, as in claim 1, wherein said alignment layers are treated such that a surface potential difference between the lower assembly and the upper assembly is adjusted.

16. A liquid crystal display device, as in claim 15, wherein either one or both of said alignment layers is treated by doping with an ionic salt, whereby the surface potential difference is changed.

* * * * *